United States Patent
Mikura et al.

(10) Patent No.: US 9,630,077 B2
(45) Date of Patent: Apr. 25, 2017

(54) GRIP FOR SPORTING GOODS AND GOLF CLUB

(71) Applicant: DUNLOP SPORTS CO. LTD., Kobe-shi, Hyogo (JP)

(72) Inventors: Chiemi Mikura, Kobe (JP); Sho Goji, Kobe (JP); Kazuyoshi Shiga, Kobe (JP); Kuniyasu Horiuchi, Kobe (JP); Toshiyuki Tarao, Kobe (JP); Hidetaka Inoue, Kobe (JP); Hitoshi Oyama, Kobe (JP); Hiroshi Hasegawa, Kobe (JP)

(73) Assignee: DUNLAP SPORTS CO. LTD., Kobe-Shi (JP)

( * ) Notice: Subject to any disclaimer, the term of this patent is extended or adjusted under 35 U.S.C. 154(b) by 0 days.

(21) Appl. No.: 14/940,791

(22) Filed: Nov. 13, 2015

(65) Prior Publication Data
US 2016/0136492 A1     May 19, 2016

(30) Foreign Application Priority Data

Nov. 14, 2014    (JP) ................................ 2014-231356

(51) Int. Cl.
     *A63B 53/14*         (2015.01)
     *A63B 60/08*         (2015.01)
     *C08K 7/22*           (2006.01)

(52) U.S. Cl.
CPC .............. *A63B 60/08* (2015.10); *A63B 53/14* (2013.01); *C08K 7/22* (2013.01); *A63B 2209/00* (2013.01)

(58) Field of Classification Search
CPC ........ C08K 7/22; C08K 5/0025; A63B 60/06; A63B 60/08; A63B 60/14; A63B 53/14
See application file for complete search history.

(56) References Cited

U.S. PATENT DOCUMENTS 4,819,939 A * 4/1989 Kobayashi ............. A63B 53/14
                                                                  473/299
5,545,094 A * 8/1996 Hsu ........................ A63B 53/10
                                                                  473/317

(Continued)

FOREIGN PATENT DOCUMENTS

JP          11-57090 A      3/1999
JP         11-347166 A     12/1999

(Continued)

OTHER PUBLICATIONS

English translation of the Japanese Notice of Reasons for Rejection, dated Aug. 2, 2016, for counterpart Japanese Application No. 2014-231356.

*Primary Examiner* — John E Simms, Jr.
(74) *Attorney, Agent, or Firm* — Birch, Stewart, Kolasch & Birch, LLP (57) ABSTRACT

An object of the present invention is to provide a grip for sporting goods excellent in tensile strength and having a light weight. The present invention provides a grip for sporting goods comprising a cylindrical portion composed of a cylindrical inner layer and a cylindrical outer layer covering the cylindrical inner layer, wherein the cylindrical inner layer is a porous rubber layer or a porous resin layer, and the cylindrical outer layer is formed from a rubber composition containing an acrylonitrile-butadiene based rubber.

16 Claims, 2 Drawing Sheets

(56) References Cited

U.S. PATENT DOCUMENTS

| | | | | |
|---|---|---|---|---|
| 5,634,859 | A | * | 6/1997 | Nesbitt .................. A63B 53/14 473/300 |
| 6,656,057 | B2 | * | 12/2003 | Manual ................. A63B 53/14 473/300 |
| 2003/0207241 | A1 | * | 11/2003 | Manual ................. A63B 53/14 434/252 |
| 2004/0031127 | A1 | * | 2/2004 | Chen ...................... A63B 49/08 16/436 |
| 2005/0020374 | A1 | * | 1/2005 | Wang .................... A63B 53/14 473/300 |
| 2006/0128894 | A1 | | 6/2006 | Nasreddine et al. |
| 2011/0165958 | A1 | * | 7/2011 | Hachiro ................. A63B 53/14 473/300 |
| 2012/0129624 | A1 | * | 5/2012 | Ito ......................... A63B 53/14 473/303 |
| 2013/0079173 | A1 | * | 3/2013 | Wu ........................ A63B 53/14 473/300 |

FOREIGN PATENT DOCUMENTS

| | | | | |
|---|---|---|---|---|
| JP | 1998-196423 | * | 12/1999 | ............ A63B 53/14 |
| JP | 2003-117035 | A | 4/2003 | |
| JP | 3701220 | B2 | 9/2005 | |
| JP | 2006-169523 | A | 6/2006 | |
| JP | 2007-325862 | A | 12/2007 | |
| JP | 2009-112500 | A | 5/2009 | |

\* cited by examiner

GRIP FOR SPORTING GOODS AND GOLF CLUB

FIELD OF THE INVENTION

The present invention relates to a grip for sporting goods.

DESCRIPTION OF THE RELATED ART

As a grip (anti-slip member) provided on sporting goods, a grip made of a rubber is frequently utilized. As such a rubber grip, for example, Japanese Patent No. 3701220 B discloses a golf club grip formed by crosslinking a rubber composition, wherein the rubber composition contains an acrylonitrile-butadiene rubber having a glass transition point of −40° C. or more and −13° C. or less in a ratio of 45 mass % or more with respect to a total amount of a base polymer; a peak temperature of a loss coefficient curve of the grip is −29° C. or more and 0° C. or less, when measured with a viscoelastic spectrometer under conditions of initial strain of 10%, amplitude of ±2%, frequency of 10 Hz, start temperature of −100° C., end temperature of 100° C., temperature rising speed of 3° C./min, and a deformation mode of tension (refer to claim 4 of Japanese Patent No. 3701220 B).

A light weight grip has also been proposed. For example, Japanese Patent Publication No. H11-347166 A discloses a golf club grip composed of a surface layer formed from a solid rubber and an inner layer formed from a foamed rubber, wherein the grip is imparted a light weight by forming the inner layer from a foamed rubber obtained by adding and mixing an organic-solvent-containing copolymer of vinylidene chloride and acrylonitrile into an unvulcanized rubber formulation to obtain a material, and then vulcanization molding the material (refer to claim 2 of Japanese Patent Publication No. H11-347166 A).

SUMMARY OF THE INVENTION

An object of the present invention is to provide a grip for sporting goods excellent in tensile strength with a light weight.

The grip for sporting goods according to the present invention that has solved the above problems comprises a cylindrical portion composed of a cylindrical inner layer and a cylindrical outer layer covering the inner layer, wherein the cylindrical inner layer is a porous rubber layer or a porous resin layer, and the cylindrical outer layer is formed from a rubber composition containing an acrylonitrile-butadiene based rubber. If the cylindrical inner layer has a porous structure, it is possible to decrease a weight of the grip, and if the cylindrical outer layer contains the acrylonitrile-butadiene based rubber, it is possible to improve the tensile strength of the grip.

The present invention also provides a golf club comprising a shaft, a head provided on one end of the shaft, and a grip provided on another end of the shaft, wherein the grip is the above-described grip for sporting goods.

According to the present invention, a grip for sporting goods excellent in tensile strength with a light weight is obtained.

DESCRIPTION OF THE PREFERRED EMBODIMENT

The grip for sporting goods according to the present invention comprises a cylindrical portion composed of a cylindrical inner layer and a cylindrical outer layer covering the inner layer. In addition, in the grip for sporting goods according to the present invention, the cylindrical inner layer is a porous rubber layer or a porous resin layer, and the cylindrical outer layer is formed from a rubber composition containing an acrylonitrile-butadiene based rubber. If the cylindrical inner layer has a porous structure, it is possible to decrease a weight of the grip, and if the cylindrical outer layer contains the acrylonitrile-butadiene based rubber, it is possible to improve tensile strength of the grip.

(Cylindrical Outer Layer)

The cylindrical outer layer is formed from an outer layer rubber composition containing an acrylonitrile-butadiene based rubber as a base rubber. If the outer layer contains the acrylonitrile-butadiene based rubber, the grip shows improved tensile strength as well as good grip performance in a wet state.

Examples of the acrylonitrile-butadiene based rubber include an acrylonitrile-butadiene rubber (NBR), a carboxyl-modified acrylonitrile-butadiene rubber (XNBR), a hydrogenated acrylonitrile-butadiene rubber (HNBR), and a carboxyl-modified hydrogenated acrylonitrile-butadiene rubber (HXNBR). XNBR is a copolymer of a monomer having a carboxyl group, acrylonitrile and butadiene. HNBR is a hydrogenated product of the acrylonitrile-butadiene rubber. XHNBR is a hydrogenated copolymer of a monomer having a carboxyl group, acrylonitrile and butadiene.

The outer layer rubber composition may further contain a rubber other than the acrylonitrile-butadiene based rubber as the base rubber. The amount of the acrylonitrile-butadiene based rubber in the base rubber is preferably 50 mass % or more, more preferably 60 mass % or more, even more preferably 70 mass % or more. In addition, it is also preferred that the outer layer rubber composition contains only the acrylonitrile-butadiene based rubber as the base rubber.

In NBR, XNBR, HNBR and HXNBR, the amount of acrylonitrile is preferably 15 mass % or more, more preferably 18 mass % or more, even more preferably 21 mass % or more, and is preferably 50 mass % or less, more preferably 45 mass % or less, even more preferably 40 mass % or less. If the amount of acrylonitrile is 15 mass % or more, the grip shows better abrasion resistance, and if the amount of acrylonitrile is 50 mass % or less, the grip shows better touch feeling in a cold region or in winter.

In HNBR and HXNBR, the amount of a double bond is preferably 0.09 mmol/g or more, more preferably 0.2 mmol/g or more, and is preferably 2.5 mmol/g or less, more preferably 2.0 mmol/g or less, even more preferably 1.5 mmol/g or less. If the amount of the double bond is 0.09 mmol/g or more, vulcanization is easily carried out during molding and the grip shows enhanced tensile strength, and if the amount of the double bond is 2.5 mmol/g or less, the grip shows better durability (weather resistance) and tensile strength. The amount of the double bond can be adjusted by the amount of butadiene in the copolymer or the amount of hydrogen added into the copolymer.

Examples of the monomer having a carboxyl group in XNBR and HXNBR include acrylic acid, methacrylic acid, fumaric acid, and maleic acid. In XNBR and HXNBR, the amount of the monomer having a carboxyl group is preferably 1.0 mass % or more, more preferably 2.0 mass % or more, even more preferably 3.5 mass % or more, and is preferably 30 mass % or less, more preferably 25 mass % or less, even more preferably 20 mass % or less. If the amount of the monomer having a carboxyl group is 1.0 mass % or more, the grip shows better abrasion resistance, and if the amount of the monomer having a carboxyl group is 30 mass % or less, the grip shows better touch feeling in a cold region or in winter.

In XNBR and HXNBR, the content of the carboxyl group is preferably 1.0 mass % or more, more preferably 2.0 mass % or more, even more preferably 3.5 mass % or more, and is preferably 30 mass % or less, more preferably 25 mass % or less, even more preferably 20 mass % or less. If the content of the carboxyl group is 1.0 mass % or more, the grip shows better abrasion resistance, and if the content of the carboxyl group is 30 mass % or less, the grip shows better touch feeling in a cold region or winter.

The outer layer rubber composition preferably contains a crosslinking agent in addition to the base rubber. As the crosslinking agent, a sulfur crosslinking agent and an organic peroxide can be used. Examples of the sulfur crosslinking agent include an elemental sulfur and a sulfur donor type compound. Examples of the elemental sulfur include powdery sulfur, precipitated sulfur, colloidal sulfur, and insoluble sulfur. Examples of the sulfur donor type compound include 4,4'-dithiobismorpholine. Examples of the organic peroxide include dicumyl peroxide, α,α'-bis(t-butylperoxy-m-diisopropyl)benzene, 2,5-dimethyl-2,5-di(t-butylperoxy)hexane, and 1,1-bis(t-butylperoxy)-3,3,5-trimethylcyclohexane. The crosslinking agent may be used solely, or two or more of them may be used in combination. As the crosslinking agent, the sulfur crosslinking agent is preferred, and the elemental sulfur is more preferred. The amount of the crosslinking agent is preferably 0.2 part by mass or more, more preferably 0.4 part by mass or more, even more preferably 0.6 part by mass or more, and is preferably 4.0 parts by mass or less, more preferably 3.5 parts by mass or less, even more preferably 3.0 parts by mass or less, with respect to 100 parts by mass of the base rubber.

The outer layer rubber composition preferably further contains a vulcanization accelerator or a vulcanization activator. Examples of the vulcanization accelerator include thiurams such as tetramethylthiuram disulfide (TMTD), tetrabenzylthiuram disulfide (TBzTD), tetramethylthiuram monosulfide (TMTM), and dipentamethylenethiuram tetrasulfide; guanidines such as diphenylguanidine (DPG); dithiocarbamates such as zinc dimethyldithiocarbamate (ZnPDC), and zinc dibutyldithiocarbamate; thioureas such as trimethylthiourea, and N,N'-diethylthiourea; thiazoles such as mercaptobenzothiazole (MBT), and benzothiazole disulfide; sulfenamides such as N-cyclohexyl-2-benzothiazolylsulfenamide (CBS), and N-t-butyl-2-benzothiazolylsulfenamide (BBS); and the like. These vulcanization accelerators may be used solely, or two or more of them may be used in combination. The amount of the vulcanization accelerator is preferably 0.4 part by mass or more, more preferably 0.8 part by mass or more, even more preferably 1.2 parts by mass or more, and is preferably 8.0 parts by mass or less, more preferably 7.0 parts by mass or less, even more preferably 6.0 parts by mass or less, with respect to 100 parts by mass of the base rubber.

Examples of the vulcanization activator include a metal oxide, a metal peroxide, and a fatty acid. Examples of the metal oxide include zinc oxide, magnesium oxide, and lead oxide. Examples of the metal peroxide include zinc peroxide, chromium peroxide, magnesium peroxide, and calcium peroxide. Examples of the fatty acid include stearic acid, oleic acid, and palmitic acid. These vulcanization activators may be used solely, or two or more of them may be used in combination. The amount of the vulcanization activator is preferably 0.5 part by mass or more, more preferably 0.6 part by mass or more, even more preferably 0.7 part by mass or more, and is preferably 10.0 parts by mass or less, more preferably 9.5 parts by mass or less, even more preferably 9.0 parts by mass or less, with respect to 100 parts by mass of the base rubber.

The outer layer rubber composition may further contain a reinforcing material, antioxidant, softening agent, coloring agent, antiscorching agent, and the like where necessary.

Examples of the reinforcing material include carbon black and silica. The amount of the reinforcing material is preferably 2.0 parts by mass or more, more preferably 3.0 parts by mass or more, even more preferably 4.0 parts by mass or more, and is preferably 50 parts by mass or less, more preferably 45 parts by mass or less, even more preferably 40 parts by mass or less, with respect to 100 parts by mass of the base rubber.

Examples of the antioxidant include imidazoles, amines, phenols and thioureas. Examples of the imidazoles include nickel dibutyldithiocarbamate (NDIBC), 2-mercaptobenzimidazole, and zinc salt of 2-mercaptobenzimidazole. Examples of the amines include phenyl-α-naphtylamine. Examples of the phenols include 2,2'-methylene bis(4-methyl-6-t-butylphenol) (MBMBP), and 2,6-di-tert-butyl-4-methylphenol. Examples of the thioureas include tributyl thiourea, and 1,3-bis(dimethylaminopropyl)-2-thiourea. These antioxidants may be used solely, or two or more of them may be used in combination. The amount of the antioxidant is preferably 0.2 part by mass or more, more preferably 0.3 part by mass or more, even more preferably 0.4 part by mass or more, and is preferably 5.0 parts by mass or less, more preferably 4.8 parts by mass or less, even more preferably 4.6 parts by mass or less, with respect to 100 parts by mass of the base rubber.

Examples of the softening agent include a mineral oil and a plasticizer. Examples of the mineral oil include paraffin oil, naphthene oil, and aromatic oil. Examples of the plasticizer include dioctyl phthalate, dibutyl phthalate, dioctyl sebacate, and dioctyl adipate.

Examples of the antiscorching agent include an organic acid and a nitroso compound. Examples of the organic acid include phthalic anhydride, pyromellitic anhydride, trimellitic anhydride, benzoic acid, salicylic acid, and malic acid. Examples of the nitroso compound include N-nitrosodiphenylamine, N-(cyclohexylthio)phthalimide, sulfonamide derivative, diphenyl urea, bis(tridecyl)pentaerythritol diphosphite, and 2-mercaptobenzimidazole.

The outer layer rubber composition can be prepared by a conventionally known method, for example, by mixing and kneading raw materials using a kneading machine such as Banbury mixer, kneader, and open roll. The temperature (material temperature) performing mixing and kneading preferably ranges from 70° C. to 160° C. In addition, when the composition contains microballoons which will be described later, mixing and kneading are preferably performed at a temperature lower than the expansion starting temperature of the microballoons.

The cylindrical outer layer may be a solid layer or a porous layer. If the cylindrical outer layer is a porous layer, the grip for sporting goods has further reduced weight.

Examples of the method producing the porous layer include a balloon foaming method, chemical foaming method, supercritical carbon dioxide injection molding method, salt extraction method, and solvent removing method. In the balloon foaming method, microballoons are allowed to be contained in the rubber composition, and then be expanded by heating to perform foaming. In addition, the expanded microballoons may be blended in the rubber composition, and then the resultant rubber composition is molded. In the chemical foaming method, a foaming agent (such as azodicarbonamide, azobisisobutyronitrile, N,N'-dinitrosopentamethylenetetramine, p-toluenesulfonyl hydrazine, and p-oxybis(benzenesulfonohydrazide)) and a foaming auxiliary are allowed to be contained in the rubber composition, and then a gas (such as carbon dioxide gas and nitrogen gas) is generated by a chemical reaction to perform foaming. In the supercritical carbon dioxide injection molding method, the rubber composition is immersed in carbon dioxide being in a supercritical state at a high pressure, the resultant rubber composition is injected at a normal pressure, and carbon dioxide is gasified to perform foaming. In the salt extraction method, a soluble salt (such as boric acid and calcium chloride) is allowed to be contained in the rubber composition, and then the salt is dissolved and extracted after molding to form fine pores. In the solvent removing method, a solvent is allowed to be contained in the rubber composition, and then the solvent is removed after molding to form fine pores.

When the cylindrical outer layer is a porous layer, a foamed layer formed from an outer layer rubber composition containing the acrylonitrile-butadiene based rubber and a foaming agent is preferred. In particular, a foamed layer formed by the balloon foaming method is preferred. In other words, the cylindrical outer layer is preferably a foamed layer formed from an outer layer rubber composition containing microballoons. If microballoons are used, the cylindrical outer layer has a light weight while maintaining the mechanical strength thereof. As the microballoons, organic microballoons or inorganic microballoons may be used. Examples of the organic microballoons include hollow particles formed from a thermoplastic resin, and resin capsules encapsulating a hydrocarbon having a low boiling point in a shell formed from a thermoplastic resin. Specific examples of the resin capsules include Expancel (registered trademark) manufactured by Akzo Nobel Company, and Matsumoto Microsphere (registered trademark) manufactured by Matsumoto Yushi Seiyaku Co., Ltd. Examples of the inorganic microballoons include hollow glass particles (such as silica balloons and alumina balloons), and hollow ceramic particles.

The volume average particle diameter of the resin capsules (before expansion) is preferably 5 µm or more, more preferably 6 µm or more, even more preferably 9 µm or more, and is preferably 90 µm or less, more preferably 70 µm or less, even more preferably 60 µm or less.

When the cylindrical outer layer is formed by the balloon foaming method, the amount of microballoons in the outer layer rubber composition is preferably 1.0 part by mass or more, more preferably 1.2 parts by mass or more, even more preferably 1.5 parts by mass or more, and is preferably 10 parts by mass or less, more preferably 8 parts by mass or less, even more preferably 6 parts by mass or less, with respect to 100 parts by mass of the base rubber. If the amount of microballoons is 1.0 part by mass or more, foaming can be performed more uniformly at the time of forming the porous layer, and if the amount of microballoons is 10 parts by mass or less, the porous layer strikes a good balance between light weight and mechanical strength.

The foaming ratio of the cylindrical outer layer formed by the balloon foaming method is preferably 1.1 or more, more preferably 1.2 or more, and is preferably 2.0 or less, more preferably 1.8 or less, even more preferably 1.5 or less. If the foaming ratio is 1.1 or more, the grip shows a greater effect of reducing weight, and if the foaming ratio is 2.0 or less, lowering in the mechanical strength of the cylindrical outer layer can be suppressed.

[Cylindrical Inner Layer]

The cylindrical inner layer is a porous rubber layer or a porous resin layer. The porous rubber layer or porous resin layer comprises many fine pores (voids) being formed in a rubber or resin which is a base material. If many fine pores are formed, the layer shows a smaller apparent density, and thus has a light weight. The porous layer can be formed by the same method for producing the cylindrical outer layer, such as the balloon foaming method, chemical foaming method, supercritical carbon dioxide injection molding method, salt extraction method, and solvent removing method.

The cylindrical inner layer is preferably a foamed layer formed from an inner layer composition containing the base material (base rubber or base resin) and a foaming agent. In particular, a foamed layer formed by the balloon foaming method is preferred. In other words, the cylindrical inner layer is preferably a foamed layer formed from an inner layer composition containing microballoons. If microballoons are used, the cylindrical inner layer has a light weight while maintaining the mechanical strength thereof. Examples of the microballoons include those employed in the outer layer rubber composition, and the resin capsules encapsulating a hydrocarbon having a low boiling point in a shell formed from a thermoplastic resin are preferred.

When the cylindrical inner layer is formed by the balloon foaming method, the amount of microballoons in the inner layer composition is preferably 5 parts by mass or more, more preferably 8 parts by mass or more, even more preferably 12 parts by mass or more, and is preferably 20 parts by mass or less, more preferably 18 parts by mass or less, even more preferably 15 parts by mass or less, with respect to 100 parts by mass of the base material (base rubber or base resin). If the amount of microballoons is 5 parts by mass or more, the grip shows a greater effect of reducing weight, and if the amount of microballoons is 20 parts by mass or less, lowering in the mechanical strength of the cylindrical inner layer can be suppressed.

The foaming ratio of the cylindrical inner layer formed by the balloon foaming method is preferably 1.2 or more, more preferably 1.5 or more, even more preferably 1.8 or more, and is preferably 5.0 or less, more preferably 4.5 or less, even more preferably 4.0 or less. If the foaming ratio is 1.2 or more, the grip shows a greater effect of reducing weight, and if the foaming ratio is 5.0 or less, lowering in the mechanical strength of the cylindrical inner layer can be suppressed.

The porous rubber layer can be formed from an inner layer rubber composition containing a base rubber and a crosslinking agent. Examples of the base rubber include a natural rubber (NR), ethylene-propylene-diene rubber (EPDM), butyl rubber (IIR), acrylonitrile-butadiene rubber (NBR), hydrogenated acrylonitrile-butadiene rubber (HNBR), carboxyl-modified acrylonitrile-butadiene rubber (XNBR), butadiene rubber (BR), styrene-butadiene rubber (SBR), polyurethane rubber (PU), isoprene rubber (IR), chloroprene rubber (CR), and ethylene-propylene rubber (EPM). Among them, NR, EPDM, IIR, NBR, HNBR, XNBR, BR, SBR, and PU are preferred as the base rubber.

Examples of the crosslinking agent include the same one as those employed in the outer layer rubber composition, and the elemental sulfur is preferred. The inner layer rubber composition preferably further contains a vulcanization accelerator and a vulcanization activator. Examples of these vulcanization accelerator and vulcanization activator include the same one as those employed in the outer layer rubber composition. As the vulcanization accelerator, N-t-butyl-2-benzothiazolylsulfenamide and tetrabenzylthiuram disulfide are preferred. As the vulcanization activator, zinc oxide and stearic acid are preferred.

The inner layer rubber composition may further contain a reinforcing material, antioxidant, softening agent, coloring agent, antiscorching agent, and the like where necessary. Examples of these reinforcing material, antioxidant and coloring agent include the same one as those employed in the outer layer rubber composition. As the reinforcing material, carbon black and silica are preferred. As the antioxidant, 2,2'-methylene bis(4-methyl-6-t-butylphenol) is preferred.

The inner layer rubber composition can be prepared by a conventionally known method, for example, by mixing and kneading raw materials using a kneading machine such as Banbury mixer, kneader, and open roll. The temperature (material temperature) performing mixing and kneading preferably ranges from 70° C. to 160° C. In addition, when the composition contains microballoons, mixing and kneading are preferably performed at a temperature lower than the expansion starting temperature of the microballoons.

The porous resin layer can be formed from an inner layer resin composition containing a base resin. Examples of the base resin include a polyurethane resin, a polystyrene resin, a polyethylene resin, a polypropylene resin, an ethylene-vinyl acetate copolymer resin, and a polyethylene terephthalate resin.

[Construction]

The grip for sporting goods according to the present invention comprises a cylindrical portion composed of a cylindrical inner layer and a cylindrical outer layer covering the inner layer.

The thickness of the cylindrical portion is preferably 0.5 mm or more, more preferably 1.0 mm or more, even more preferably 1.5 mm or more, and is preferably 17.0 mm or less, more preferably 10.0 mm or less, even more preferably 8.0 mm or less. The cylindrical portion may be formed with a fixed thickness along the axis direction, or may be formed with a thickness gradually becoming thicker from the front end part toward the back end part.

The cylindrical outer layer and cylindrical inner layer may have a uniform thickness, or may have a varied thickness. For example, the cylindrical outer layer and cylindrical inner layer may be formed with a thickness gradually becoming thicker from one end toward another end along the axis direction of the cylindrical grip. The outer layer preferably has a uniform thickness.

When the cylindrical portion has a thickness ranging from 0.5 mm to 17.0 mm, the thickness of the cylindrical outer layer is preferably 0.1 mm or more, more preferably 0.15 mm or more, even more preferably 0.2 mm or more, and is preferably 2.5 mm or less, more preferably 2.0 mm or less, even more preferably 1.5 mm or less. If the thickness of the cylindrical outer layer is 0.1 mm or more, the reinforcing effect by the outer layer material becomes greater, and if the thickness of the cylindrical outer layer is 2.5 mm or less, the cylindrical inner layer can be relatively thickened and thus the effect of reducing the weight of the grip becomes greater.

The percentage ((thickness of cylindrical outer layer/thickness of cylindrical portion)×100) of the thickness of the cylindrical outer layer to the thickness of the cylindrical portion is preferably 0.5% or more, more preferably 1.0% or more, even more preferably 1.5% or more, and is preferably 99.0% or less, more preferably 98.0% or less, even more preferably 97.0% or less. If the percentage is 0.5% or more, the reinforcing effect by the outer layer material becomes greater, and if the percentage is 99.0% or less, the cylindrical inner layer can be relatively thickened and thus the effect of reducing the weight of the grip becomes greater.

The material hardness (JIS-A) of the outer layer rubber composition is preferably 30 or more, more preferably 40 or more, even more preferably 45 or more, and is preferably 80 or less, more preferably 70 or less, even more preferably 60 or less. If the material hardness (JIS-A) of the outer layer rubber composition is 30 or more, the cylindrical outer layer shows further enhanced mechanical strength, and if the material hardness (JIS-A) of the outer layer rubber composition is 80 or less, the cylindrical outer layer does not become excessively hard and thus the grip feeling when holding the grip becomes better.

The material hardness (JIS-A) of the inner layer composition (inner layer rubber composition or inner layer resin composition) is preferably 10 or more, more preferably 15 or more, even more preferably 20 or more, and is preferably 80 or less, more preferably 70 or less, even more preferably 60 or less. If the material hardness (JIS-A) of the inner layer composition is 10 or more, the cylindrical inner layer does not become excessively soft and thus a tightly fixed touch feeling can be obtained when holding the grip, and if the material hardness (JIS-A) of the inner layer composition is 80 or less, the cylindrical inner layer does not become excessively hard and thus the grip feeling when holding the grip becomes better.

The material hardness $H_{out}$ (JIS-A) of the outer layer rubber composition is preferably same as the material hardness $H_{in}$ (JIS-A) of the inner layer composition, or larger than $H_{in}$ (JIS-A). In this case, the hardness difference ($H_{out}-H_{in}$) (JIS-A) is preferably 0 or more, more preferably 10 or more, even more preferably 20 or more, and is preferably 65 or less, more preferably 60 or less, even more preferably 55 or less. If the hardness difference ($H_{out}-H_{in}$) falls within the above range, the grip feeling when holding the grip becomes better.

Examples of the combination of the cylindrical inner layer and the cylindrical outer layer in the grip for sporting goods include a combination of a solid outer layer and a porous inner layer, and a combination of a porous outer layer and a porous inner layer. In particular, when the outer layer and the inner layer are foaming layers, the foaming ratio of the outer layer is preferably smaller than the foaming ratio of the inner layer. In this case, the ratio (inner layer/outer layer) of the foaming ratio of the inner layer to the foaming ratio of the outer layer is preferably 1.1 or more, more preferably 1.5 or more, even more preferably 2.0 or more, and is preferably 10.0 or less, more preferably 9.0 or less, even more preferably 8.0 or less.

The grip for sporting goods according to the present invention may further comprise an interlayer between the cylindrical inner layer and the cylindrical outer layer. If the interlayer is disposed, the flexibility in designing grip physical properties is enhanced. The interlayer may be disposed along the entire longitudinal direction (the axis direction of the cylindrical portion) of the grip, or may be disposed along a part of the longitudinal direction of the grip. Further, one interlayer may be disposed, or two or more interlayers may be disposed. The interlayer may be a solid layer or a porous layer. The material of the interlayer is not particularly limited, and the interlayer may be a rubber layer or a resin layer. The same material as those employed in the outer layer and inner layer can be used as the material of the interlayer.

[Adhesive Layer]

The grip for sporting goods may further comprise an adhesive layer between the layers of the inner layer, interlayer and outer layer. It is noted that the adhesive layer is a very thin layer having a thickness of 30 μm or less, and thus is different from the interlayer. Examples of the adhesive constituting the adhesive layer include a vulcanization adhesive (crosslinking adhesive), and a rubber glue. If the adhesive layer is comprised, peeling strength between the inner layer and outer layer increases.

Examples of the construction of the cylindrical portion in the grip for sporting goods include a cylindrical shape comprising the cylindrical inner layer and the cylindrical outer layer covering the inner layer; a cylindrical shape comprising the cylindrical inner layer, the cylindrical outer layer covering the inner layer, and at least one interlayer disposed between these outer layer and inner layer; and a cylindrical shape comprising the cylindrical inner layer, the cylindrical outer layer covering the inner layer, and an adhesive layer disposed between these outer layer and inner layer.

[Production Method]

The grip for sporting goods can be obtained, for example, by press molding a laminated product comprising an unvulcanized rubber sheet formed from the outer layer rubber composition and an unvulcanized rubber sheet formed from the inner layer rubber composition or a resin sheet formed from the inner layer resin composition in a mold. As the method of forming the sheet from the outer layer rubber composition or the inner layer composition, press molding or injection molding can be employed. When the laminated product is press molded, the temperature of the mold preferably ranges from 140° C. to 200° C., the molding time preferably ranges from 5 minutes to 45 minutes, and the molding pressure preferably ranges from 0.1 MPa to 150 MPa. In addition, when the foaming layer is formed by the balloon foaming method, it is preferred that balloons are not expanded when producing the outer sheet and inner sheet, and balloons are expanded when press molding the laminated product of the outer sheet and inner sheet.

[Sporting Goods]

The grip for sporting goods according to the present invention can be used as a golf club grip, fishing rod grip, bat (baseball bat, softball bat, and cricket bat) grip, stock (ski stock and walking stock) grip, and the like.

[Golf Club Grip]

As one example of the grip for sporting goods according to the present invention, the golf club grip will be described. Examples of the shape of the golf club grip include a shape having a cylindrical part for inserting a shaft and an integrally molded cap part for covering the opening of the back end of the cylindrical part. The cylindrical part has a lamination construction of the inner layer and outer layer. In other words, the golf club grip comprises a cylindrical portion for inserting a shaft therein, the cylindrical portion comprises a cylindrical inner layer and a cylindrical outer layer covering the inner layer, the inner layer is a porous rubber layer or a porous resin layer, and the outer layer is formed from a rubber composition containing an acrylonitrile-butadiene based rubber.

The cylindrical part may be formed with a fixed thickness along the axis direction, or may be formed with a thickness gradually becoming thicker from the front end part toward the back end part. In addition, the cylindrical part may be formed with a fixed thickness along the diameter direction, or a projecting strip part (so-called back line) may be formed on a part of the cylindrical part. Furthermore, a groove may be formed on the surface of the cylindrical part. Formation of a water film between the hand of the golfer and the grip may be suppressed by the groove, and thus grip performance in a wet condition is further enhanced. In addition, in view of anti-slip performance and abrasion resistance of the grip, a reinforcing cord may be disposed in the grip.

[Golf Club]

A golf club using the grip for sporting goods is also included in the present invention. The golf club comprises a shaft, a head provided on one end of the shaft, and a grip provided on another end of the shaft, wherein the grip is the above-described grip for sporting goods. The shaft can be made of stainless steel or a carbon fiber reinforcing resin. Examples of the head include a wood type, utility type, and iron type. The material constituting the head is not particularly limited, and examples thereof include titanium, a titanium alloy, a carbon fiber reinforcing plastic, stainless steel, maraging steel, and soft iron.

Figure 1:
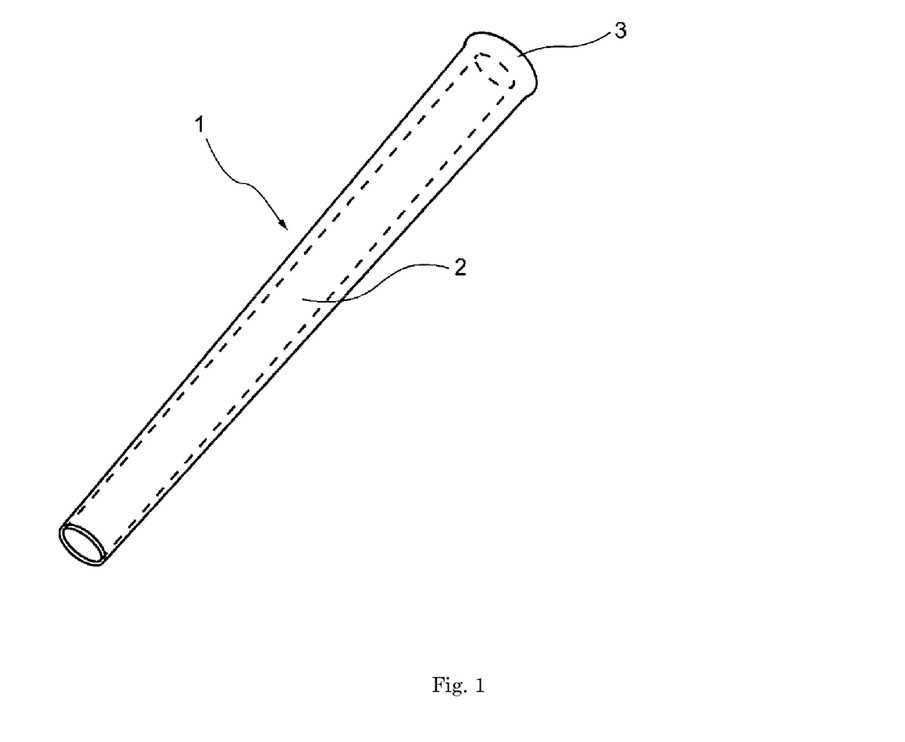
FIG. 1 is a perspective view showing one example of a golf club grip.

Next, the golf club grip and golf club will be explained with reference to figures. FIG. 1 is a perspective view showing one example of a golf club grip. A grip 1 comprises a cylindrical part 2 for inserting a shaft therein, and an integrally molded cap part 3 for covering the opening of the back end of the cylindrical part.

Figure 2:
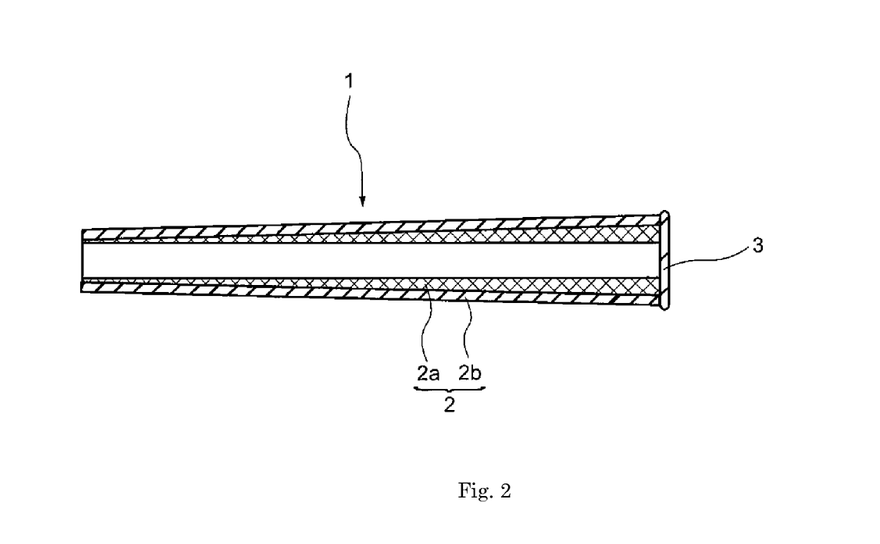
FIG. 2 is a schematic cross-section view showing one example of a golf club grip.

FIG. 2 is a schematic cross-section view showing one example of a golf club grip. The cylindrical part 2 is composed of an inner layer 2a and an outer layer 2b. The outer layer 2b is formed with a uniform thickness throughout the entire region from the front end part to the back end part. The inner layer 2a is formed with a thickness gradually becoming thicker from the front end part toward the back end part. In the grip 1 shown in FIG. 2, the cap part 3 is formed from the same rubber composition as the outer layer 2b.

Figure 3:
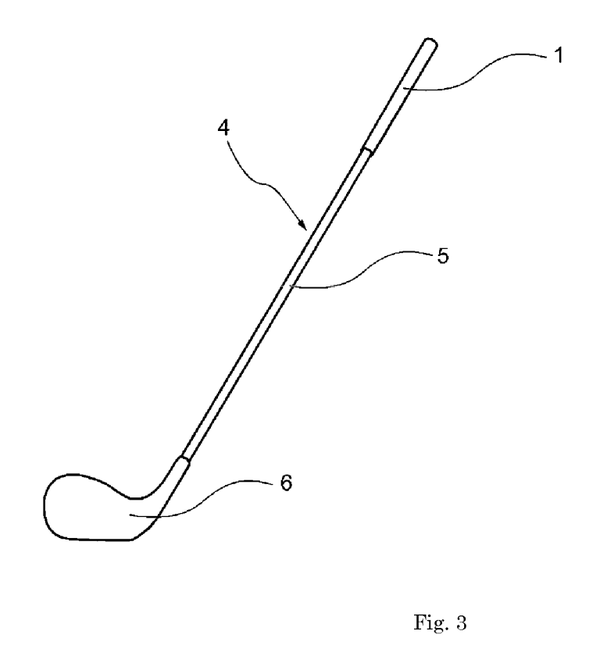
FIG. 3 is a perspective view showing one example of a golf club.

FIG. 3 is a perspective view showing one example of the golf club according to the present invention. A golf club 4 comprises a shaft 5, a head 6 provided on one end of the shaft 5, and a grip 1 provided on another end of the shaft 5. The back end of the shaft 5 is inserted into the cylindrical part 2 of the grip 1.

EXAMPLES

Hereinafter, the present invention will be described in detail by way of examples. However, the present invention is not limited to the examples described below, and various changes and modifications can be made in accordance with the spirit of the present invention and are included in the technical scope of the present invention.

[Evaluation Method]

(1) Amount of Acrylonitrile

The amount of acrylonitrile in the acrylonitrile-butadiene rubber before hydrogenation was measured according to ISO 24698-1 (2008).

(2) Amount of Double Bond (mmol/g)

The amount of the double bond is calculated from the amount (mass %) of butadiene in the copolymer and the amount (%) of a residual double bond. The amount of the residual double bond is a mass ratio (amount of the double bond after hydrogenation/amount of the double bond before hydrogenation) of the double bond in the copolymer after hydrogenation to the double bond in the copolymer before hydrogenation, and can be measured with infrared spectroscopy. In the case that the acrylonitrile-butadiene rubber is an acrylonitrile-butadiene binary copolymer, the amount of butadiene in the copolymer is calculated by subtracting the amount (mass %) of acrylonitrile from 100.

Amount of double bond={amount of butadiene/45}× amount of residual double bond×10

(3) Amount of Monomer Having Carboxyl Group 1 g of the hydrogenated acrylonitrile-butadiene rubber was weighed and dissolved in 50 ml of chloroform, a thymol blue indicator was dripped therein. 0.05 mol/L sodium hydroxide methanol solution was dripped into the solution while the solution was stirred, and the dripping amount (V ml) at the time the solution color initially changed was recorded. Regarding 50 ml of a blank, i.e. chloroform not containing the hydrogenated acrylonitrile-butadiene rubber, thymol blue was used as the indicator, 0.05 mol/L sodium hydroxide methanol solution was dripped into the solution, and the dripping amount (B ml) at the time the solution color initially changed was recorded. The amount of the monomer having the carboxyl group is calculated according to the following formula.

Amount of monomer having carboxyl group={0.05× (V−B)×PM}/(10×X)

(In the formula, V: dripping amount (ml) of sodium hydroxide solution in test solution, B: dripping amount (ml) of sodium hydroxide solution in blank, PM: molecular weight of monomer having carboxyl group, X: valence of monomer having carboxyl group.)

(4) Material Hardness (JIS-A)

Sheets with a thickness of 2 mm were formed by pressing the rubber composition at 160° C. for 8 to 20 minutes. It is noted that, in the case that the rubber composition contains microballoons, the sheets were formed by expanding microballoons in the same foaming ratio as that when forming the grip. These sheets were stored at 23° C. for two weeks. Three of these sheets were stacked on one another so as not to be affected by the measuring base on which the sheets were placed, and the stack was measured with a type P1 auto loading durometer manufactured by Kobunshi Keiki Co., Ltd., provided with a type A durometer prescribed in JIS K6253-3 (2012).

(5) Foaming Ratio

A measurement sample, i.e. the foaming layer was cut from the grip, and the density (d1) of the foaming layer was measured. Further, an unfoamed rubber sheet was produced by using the rubber composition used for forming this foaming layer, and the density (d2) of the rubber sheet was measured. The foaming ratio (d2/d1) was calculated by dividing the density of the unfoamed sheet by the density of the foamed layer. Additionally, the density was measured with an auto gravimeter (SP-GR1 manufactured by MS-TEC Co. Ltd., based on Archimedes' principle).

(6) Tensile Strength

Tensile strength was measured according to JIS K 6251 (2010). Specifically, a sample with a thickness of 2 mm was cut from the outer layer side of the grip. The sample was punched into a dumbbell shape (Dumbbell shape No. 3) to prepare a test piece, and physical properties of the test piece were measured (measurement temperature: 23° C., tensile speed: 500 mm/min) using a tensile test measurement apparatus (Autograph AGS-D manufactured by SHIMADZU Corporation). Then, tensile strength was calculated by dividing ultimate tensile force recorded until the time the test piece was broken by the initial cross-sectional area of the test piece. It is noted that tensile strength of Grip No. 3 was defined as an index of 100, and tensile strength is a value represented by converting tensile strength of each grip into this index.

(7) Grip Performance in Wet Condition

The grip was installed on the shaft to obtain a golf club. Water was put on the grip to obtain a wet condition, and ten golfers were allowed to use the golf club and evaluate anti-slipping performance in a five-grade scoring from "1" to "5". The grip that most hardly slipped was graded as "5", and the grip that most easily slipped was graded as "1". The average value of evaluation values from ten golfers for each grip was calculated, anti-slipping performance of Grip No. 3 was defined as an index of 100, and anti-slipping performance is a value represented by converting the anti-slipping performance of each grip into this index.

(8) Abrasion Resistance

Abrasion resistance was evaluated using a Gakushin type abrasion tester (FR-2 manufactured by Suga Test Instruments Co., Ltd). Specifically, a sample with a thickness of 2 mm was cut from the outer layer side of the grip, the sheet was punched into a rectangular shape with a length of 130 mm and a width of 35 mm to prepare a test piece, and the test piece was fixed on a test piece table. A sand paper (240 count) was provided on the front end of a friction block, and the region with a 100 mm length at the central part of the test piece was subjected to reciprocating friction for 500 times at a reciprocating speed of 30 times per minute under a load of 2 N. Then, abrasion resistance was evaluated according to the mass change of the test piece before and after test. Abrasion resistance of Grip No. 3 was defined as an index of 100, and abrasion resistance is a value represented by converting abrasion resistance of each grip into this index.

(9) Mass

The mass of each grip was measured. The mass of Grip No. 16 was defined as an index of 100, and the mass is a value represented by converting the mass of each grip into this index.

[Production of Grip]

According to the formulations shown in Tables 1 and 2, raw materials were mixed and kneaded with Banbury mixer (material temperature: 80° C. to 150° C.) to prepare outer layer rubber compositions and inner layer rubber compositions.

TABLE 1

| Outer layer rubber composition No. | | | A | B | C | D | E |
|---|---|---|---|---|---|---|---|
| Formulation (parts by mass) | Base rubber | NR | 60 | — | — | — | — |
| | | EPDM | 40 | — | — | — | — |
| | | NBR | — | 100 | — | — | — |
| | | HNBR1 | — | — | 100 | — | — |
| | | HNBR2 | — | — | — | 100 | — |
| | | HNBR3 | — | — | — | — | 100 |
| | | HNBR4 | — | — | — | — | — |
| | | HNBR5 | — | — | — | — | — |

TABLE 1-continued

| | | | | | | | |
|---|---|---|---|---|---|---|---|
| | | HNBR6 | — | — | — | — | — |
| | | HNBR7 | — | — | — | — | — |
| | | XNBR | — | — | — | — | — |
| | | HXNBR | — | — | — | — | — |
| | Crosslinking agent | Sulfur | 1.5 | 1.5 | 1.5 | 1.5 | 1.5 |
| | Vulcanization accelerator | NS | 1.9 | — | — | — | — |
| | | TMTD | — | 3 | 3 | 3 | 3 |
| | | TBzTD | — | — | — | — | — |
| | Vulcanization activator | Zinc oxide | 5 | 5 | 5 | 5 | 5 |
| | | Zinc peroxide (1) | — | — | — | — | — |
| | | Zinc peroxide (2) | — | — | — | — | — |
| | | Stearic acid | 1 | 2 | 2 | 2 | 2 |
| | Reinforcing material | Carbon black (1) | 2 | — | — | — | — |
| | | Carbon black (2) | — | 5 | 5 | 5 | 5 |
| | | Silica | 10 | — | — | — | — |
| | Antioxidant | NS-6 | 2 | — | — | — | — |
| | | NDIBC | — | 1.5 | 1.5 | 1.5 | 1.5 |
| | | TBTU | — | — | — | — | — |
| | Foaming agent | Microballoons | — | — | — | — | — |
| Acrylonitrile-butadiene rubber | | Amount of acrylonitrile (mass %) | — | 33.0 | 36.0 | 34.0 | 36.0 |
| | | Amount of double bond (mmol/g) | — | 12.4 | 0.24 | 0.49 | 0.71 |
| | | Amount of monomer having carboxyl group (mass %) | — | — | — | — | — |

| | | Outer layer rubber composition No. | F | G | H | I |
|---|---|---|---|---|---|---|
| Formulation (parts by mass) | Base rubber | NR | — | — | — | — |
| | | EPDM | — | — | — | — |
| | | NBR | — | — | — | — |
| | | HNBR1 | — | — | — | — |
| | | HNBR2 | — | — | — | — |
| | | HNBR3 | — | — | — | — |
| | | HNBR4 | 100 | — | — | — |
| | | HNBR5 | — | 100 | — | — |
| | | HNBR6 | — | — | 100 | — |
| | | HNBR7 | — | — | — | 100 |
| | | XNBR | — | — | — | — |
| | | HXNBR | — | — | — | — |
| | Crosslinking agent | Sulfur | 1.5 | 1.5 | 1.5 | 1.5 |
| | Vulcanization accelerator | NS | — | — | — | — |
| | | TMTD | 3 | 3 | 3 | 3 |
| | | TBzTD | — | — | — | — |
| | Vulcanization activator | Zinc oxide | — | — | — | — |
| | | Zinc peroxide (1) | 5 | 5 | 5 | 5 |
| | | Zinc peroxide (2) | — | — | — | — |
| | | Stearic acid | 2 | 2 | 2 | 2 |
| | Reinforcing material | Carbon black (1) | — | — | — | — |
| | | Carbon black (2) | 5 | 5 | 5 | 5 |
| | | Silica | — | — | — | — |
| | Antioxidant | NS-6 | — | — | — | — |
| | | NDIBC | 1.5 | 1.5 | 1.5 | 1.5 |
| | | TBTU | — | — | — | — |
| | Foaming agent | Microballoons | — | — | — | — |
| Acrylonitrile-butadiene rubber | | Amount of acrylonitrile (mass %) | 21.0 | 43.0 | 49.0 | 34.0 |
| | | Amount of double bond (mmol/g) | 0.80 | 0.58 | 0.09 | 2.20 |
| | | Amount of monomer having carboxyl group (mass %) | — | — | — | — |

| | | Outer layer rubber composition No. | J | K | L | M |
|---|---|---|---|---|---|---|
| Formulation (parts by mass) | Base rubber | NR | — | — | — | — |
| | | EPDM | — | — | — | — |
| | | NBR | — | — | — | — |
| | | HNBR1 | — | — | — | — |
| | | HNBR2 | — | — | — | — |
| | | HNBR3 | — | — | — | — |
| | | HNBR4 | — | — | — | — |
| | | HNBR5 | — | — | — | — |
| | | HNBR6 | — | — | — | — |
| | | HNBR7 | — | — | — | — |
| | | XNBR | — | — | — | 100 |
| | | HXNBR | 100 | 100 | 100 | — |
| | Crosslinking agent | Sulfur | 1.5 | 1.5 | 1.5 | 1.5 |
| | Vulcanization accelerator | NS | — | — | — | — |
| | | TMTD | 3 | — | — | — |
| | | TBzTD | — | 3 | 3 | 3 |
| | Vulcanization activator | Zinc oxide | — | — | — | — |
| | | Zinc peroxide (1) | 5 | — | — | 5 |
| | | Zinc peroxide (2) | — | 5 | 5 | — |
| | | Stearic acid | 2 | 2 | 2 | 2 |

TABLE 1-continued

|  |  |  |  |  |  |  |
|---|---|---|---|---|---|---|
| Reinforcing material | Carbon black (1) | | — | — | — | — |
| | Carbon black (2) | | 5 | 5 | 5 | 5 |
| | Silica | | — | — | — | — |
| Antioxidant | NS-6 | | — | — | — | — |
| | NDIBC | | 1.5 | — | — | 1.5 |
| | TBTU | | — | 1.0 | 1.0 | — |
| Foaming agent | Microballoons | | — | — | 1.5 | — |
| Acrylonitrile-butadiene rubber | Amount of acrylonitrile (mass %) | | 33.0 | 33.0 | 33.0 | 27.0 |
| | Amount of double bond (mmol/g) | | 0.40 | 0.40 | 0.40 | — |
| | Amount of monomer having carboxyl group (mass %) | | 5.0 | 5.0 | 5.0 | 7.5 |

TABLE 2

| Inner layer rubber composition No. | | | a | b |
|---|---|---|---|---|
| Formulation (parts by mass) | Base rubber | NR | 60 | — |
| | | EPDM | 40 | — |
| | | HNBR2 | — | 100 |
| | Crosslinking agent | Sulfur | 1.5 | 1.5 |
| | Vulcanization accelerator | NS | 1.9 | — |
| | | TBzTD | — | 3 |
| | Vulcanization activator | Zinc oxide | 5 | 5 |
| | | Stearic acid | 1 | 2 |
| | Reinforcing material | Carbon black (1) | 2 | — |
| | | Carbon black (2) | — | 5 |
| | | Silica | 10 | — |
| | Antioxidant | NS-6 | 2 | — |
| | Foaming agent | Microballoons | 12 | 8 |

Materials used in Tables 1 and 2 are shown below.
NR (natural rubber): TSR 20
EPDM (ethylene-propylene-diene rubber): ESPRENE (registered trademark) 505 A manufactured by Sumitomo Chemical Co., Ltd.
NBR: acrylonitrile-butadiene rubber (Krynac (registered trademark) 3345F (amount of acrylonitrile: 33.0 mass %) manufactured by Lanxess Corporation)
HNBR1: hydrogenated acrylonitrile-butadiene rubber (Therban (registered trademark) 3629 (amount of residual double bond: 2.0%, amount of acrylonitrile: 36.0 mass %) manufactured by Lanxess Corporation)
HNBR2: hydrogenated acrylonitrile-butadiene rubber (Therban 3446 (amount of residual double bond: 4.0%, amount of acrylonitrile: 34.0 mass %) manufactured by Lanxess Corporation)
HNBR3: hydrogenated acrylonitrile-butadiene rubber (Therban 3668 VP (amount of residual double bond: 6.0%, amount of acrylonitrile: 36.0 mass %) manufactured by Lanxess Corporation)
HNBR4: hydrogenated acrylonitrile-butadiene rubber (Therban LT2057 (amount of residual double bond: 5.5%, amount of acrylonitrile: 21.0 mass %) manufactured by Lanxess Corporation)
HNBR5: hydrogenated acrylonitrile-butadiene rubber (Therban 4369 (amount of residual double bond: 5.5%, amount of acrylonitrile: 43.0 mass %) manufactured by Lanxess Corporation)
HNBR6: hydrogenated acrylonitrile-butadiene rubber (Therban AT 5005 VP (amount of residual double bond: 0.9%, amount of acrylonitrile: 49.0 mass %) manufactured by Lanxess Corporation)
HNBR7: hydrogenated acrylonitrile-butadiene rubber (Therban 3496 (amount of residual double bond: 18.0%, amount of acrylonitrile: 34.0 mass %) manufactured by Lanxess Corporation)
XNBR: carboxyl-modified acrylonitrile-butadiene rubber (Krynac X750 (amount of acrylonitrile: 27.0 mass %, amount of monomer having carboxylic acid: 7.5 mass %) manufactured by Lanxess Corporation)
HXNBR: hydrogenated carboxyl-modified acrylonitrile-butadiene rubber (Therban XT VPKA 8889 (amount of residual double bond: 3.5%, amount of acrylonitrile: 33.0 mass %, amount of monomer having carboxyl group: 5.0 mass %) manufactured by Lanxess Corporation)
Sulfur: 5% oil treated sulfur fine powder (200 mesh) manufactured by Tsurumi Chemical Industry Co., Ltd.
NS: N-t-butyl-2-benzothiazolylsulfenamide (NOCCELER (registered trademark) NS manufactured by Ouchi Shinko Chemical Industry Co., Ltd.)
TMTD: tetramethyithiuram disulfide (NOCCELER TT-P manufactured by Ouchi Shinko Chemical Industry Co., Ltd.)
TBzTD: tetrabenzylthiuram disulfide (NOCCELER TBzTD manufactured by Ouchi Shinko Chemical Industry Co., Ltd.)
Zinc oxide: Ginrei R manufactured by Toho Zinc Co., Ltd.
Zinc peroxide (1): manufactured by Sigma-Aldrich Corporation
Zinc peroxide (2): Struktol ZP 1014 (content of zinc peroxide: 29 mass %) manufactured by Struktol Company
Stearic acid: beads stearic acid camellia manufactured by NOF Co., Ltd.
Carbon black (1): DIABLACK N220 manufactured by Mitsubishi Chemical Corporation
Carbon black (2): SEAST SO (FEF) manufactured by Tokai Carbon Co., Ltd.
Silica: ULTRASIL VN3 manufactured by EVONIK Industries
NS-6: 2,2'-methylene bis(4-methyl-6-t-butylphenol) (NOCRAC (registered trademark) NS-6 manufactured by Ouchi Shinko Chemical Industry Co., Ltd.)
NDIBC: nickel dibutyldithiocarbamate (NOCRAC NBC manufactured by Ouchi Shinko Chemical Industry Co., Ltd.)
TBTU: tributylthiourea (NOCRAC TBTU manufactured by Ouchi Shinko Chemical Industry Co., Ltd.)
Microballoons: "Expancel 909-80° (resin capsules encapsulating a hydrocarbon having a low boiling point in a shell formed from a thermoplastic resin, volume average diameter: 18 μm to 24 μm, expansion starting temperature: 120° C. to 130° C.) manufactured by Akzo Nobel Company Grips No. 1 and No. 3 to No. 15

The unvulcanized rubber sheet having a fan shape and the cap member were prepared using the outer layer rubber composition. The outer layer rubber sheet was formed with a fixed thickness. The unvulcanized rubber sheet having a rectangular shape was prepared using the inner layer rubber composition. The inner layer rubber sheet was formed with a thickness gradually becoming thicker from one end toward the other end. The inner layer rubber sheet was wound around a mandrel, and then the outer layer rubber sheet was laminated and wound around thereon. The mandrel having these rubber sheets being wound therearound, and the cap member were charged into a mold having a groove pattern on the cavity surface thereof. The heat treatment was performed at a mold temperature of 160° C. for 15 minutes to obtain golf club grips. In the obtained golf club grips, the cylindrical portion had a thickness of 1.5 mm at the thinnest part (the end part on the head side), and a thickness of 6.7 mm at the thickest part (the end part on the grip end side). Evaluation results for each of the grips are shown in Table 3.

Grips No. 2 and No. 16

The inner layer rubber composition and outer layer rubber composition were charged into a mold having a groove pattern on the cavity surface thereof. The heat treatment was performed at a mold temperature of 160° C. for 15 minutes to obtain golf club grips. Grips No. 2 and No. 16 had a single-layered construction, but had the same shape as Grips No. 1 and No. 3 to No. 15. Evaluation results of the grips are shown in Table 3.

employing NBR in the outer layer. In addition, the grip (Grips No. 11 and No. 14) employing XNBR or HXNBR in the outer layer also shows improved abrasion resistance compared to the grip (Grip No. 3) employing NBR in the outer layer.

This application is based on Japanese patent application No. 2014-231356 filed on Nov. 14, 2014, the content of which is hereby incorporated by reference.

The invention claimed is:

1. A grip for sporting goods comprising a cylindrical portion composed of a cylindrical inner layer and a cylindrical outer layer covering the cylindrical inner layer, wherein
the cylindrical inner layer is a porous rubber layer,
the cylindrical inner layer is a foamed layer formed from an inner layer composition containing a base rubber and microballoons,
the cylindrical inner layer has a foaming ratio ranging from 1.2 to 5.0,

TABLE 3

| | Grip No. | 1 | 2 | 3 | 4 | 5 | 6 | 7 | 8 | 9 | 10 |
|---|---|---|---|---|---|---|---|---|---|---|---|
| Outer layer | Rubber composition No. | A | No | B | C | D | E | F | G | H | I |
| | Base rubber | NR, EPDM | | NBR | HNBR | HNBR | HNBR | HNBR | HNBR | HNBR | HNBR |
| | Material hardness (JIS-A) | 53 | | 55 | 56 | 55 | 51 | 53 | 51 | 52 | 53 |
| | Type | Solid | | Solid | Solid | Solid | Solid | Solid | Solid | Solid | Solid |
| | Foaming ratio | — | | — | — | — | — | — | — | — | — |
| | Thickness (mm) | 0.2 | | 0.2 | 0.2 | 0.2 | 0.2 | 0.2 | 0.2 | 0.2 | 0.2 |
| Inner layer | Rubber composition No. | a | a | a | a | a | a | a | a | a | a |
| | Base rubber | NR, EPDM | NR, EPDM | NR, EPDM | NR, EPDM | NR, EPDM | NR, EPDM | NR, EPDM | NR, EPDM | NR, EPDM | NR, EPDM |
| | Material hardness (JIS-A) | 26 | 45 | 26 | 26 | 26 | 26 | 26 | 26 | 26 | 26 |
| | Type | Foamed | Foamed | Foamed | Foamed | Foamed | Foamed | Foamed | Foamed | Foamed | Foamed |
| | Foaming ratio | 3.3 | 2 | 3.3 | 3.3 | 3.3 | 3.3 | 3.3 | 3.3 | 3.3 | 3.3 |
| Evaluation | Mass | 50 | 50 | 50 | 50 | 50 | 50 | 50 | 50 | 50 | 50 |
| | Tensile strength | 137 | 30 | 100 | 1006 | 710 | 413 | 153 | 983 | 401 | 143 |
| | Grip performance in wet condition | 119 | — | 100 | 97 | 91 | 90 | 92 | 92 | 91 | 93 |
| | Abrasion resistance | 57 | — | 100 | — | — | — | — | — | — | — |

| | Grip No. | 11 | 12 | 13 | 14 | 15 | 16 |
|---|---|---|---|---|---|---|---|
| Outer layer | Rubber composition No. | J | K | L | M | K | No |
| | Base rubber | HXNBR | HXNBR | HXNBR | XNBR | HXNBR | |
| | Material hardness (JIS-A) | 62 | 56 | 60 | 59 | 56 | |
| | Type | Solid | Solid | Foamed | Solid | Solid | |
| | Foaming ratio | — | — | 1.2 | — | — | |
| | Thickness (mm) | 0.2 | 0.2 | 0.2 | 0.2 | 0.2 | |
| Inner layer | Rubber composition No. | a | a | a | a | b | B |
| | Base rubber | NR, EPDM | NR, EPDM | NR, EPDM | NR, EPDM | HNBR | NBR |
| | Material hardness (JIS-A) | 26 | 26 | 26 | 26 | 39 | 55 |
| | Type | Foamed | Foamed | Foamed | Foamed | Foamed | Solid |
| | Foaming ratio | 3.3 | 3.3 | 3.3 | 3.3 | 3.1 | — |
| Evaluation | Mass | 50 | 50 | 49 | 50 | 50 | 100 |
| | Tensile strength | 784 | 771 | 256 | 231 | 771 | — |
| | Grip performance in wet condition | 93 | 93 | — | 98 | 93 | — |
| | Abrasion resistance | 425 | — | — | 954 | — | — |

Grip No. 2 is the case not having an outer layer, and shows very low tensile strength. Grip No. 1 is the case comprising a porous inner layer and an outer layer containing a NR based rubber, and shows higher tensile strength than Grip No. 2. Grips No. 3 to No. 15 are the cases comprising a porous inner layer and an outer layer containing a NBR based rubber. Each of these Grips No. 3 to No. 15 shows further improved tensile strength compared to Grip No. 1. Among them, the grip (Grips No. 4 to No. 15) employing HNBR, HXNBR or XNBR in the outer layer shows further improved tensile strength compared to the grip (Grip No. 3)

the cylindrical outer layer is a foamed layer formed from a rubber composition containing acrylonitrile-butadiene based rubber and a foaming agent, and
the cylindrical outer layer has a smaller foaming ratio than the cylindrical inner layer.

2. The grip for sporting goods according to claim 1, wherein the inner layer composition contains the microballoons in an amount ranging from 5 parts by mass to 20 parts by mass with respect to 100 parts by mass of the base rubber.

3. The grip for sporting goods according to claim 1, wherein the base rubber is at least one selected from the group consisting of a natural rubber, an ethylene-propylene-diene rubber, a butyl rubber, an acrylonitrile-butadiene rubber, a hydrogenated acrylonitrile-butadiene rubber, a carboxyl-modified acrylonitrile-butadiene rubber, a butadiene rubber, a styrene-butadiene rubber, and a polyurethane rubber.

4. The grip for sporting goods according to claim 1, wherein the acrylonitrile-butadiene based rubber is at least one selected from the group consisting of a carboxyl-modified acrylonitrile-butadiene rubber, a hydrogenated acrylonitrile-butadiene rubber, and a carboxyl-modified hydrogenated acrylonitrile-butadiene rubber.

5. The grip for sporting goods according to claim 1, further comprising an adhesive layer between the cylindrical inner layer and the cylindrical outer layer.

6. The grip for sporting goods according to claim 1, wherein the cylindrical outer layer has a thickness of 0.1 mm or more.

7. The grip for sporting goods according to claim 1, wherein the cylindrical outer layer has a material hardness ranging from 30 to 80 in JIS-A hardness, and the cylindrical inner layer has a material hardness ranging from 10 to 80 in JIS-A hardness.

8. The grip for sporting goods according to claim 1, wherein the cylindrical outer layer is a solid layer.

9. A golf club comprising a shaft, a head provided on one end of the shaft, and a grip provided on another end of the shaft, wherein the grip comprises a cylindrical portion composed of a cylindrical inner layer and a cylindrical outer layer covering the cylindrical inner layer, and wherein
the cylindrical inner layer is a porous rubber layer,
the cylindrical inner layer is a foamed layer formed from an inner layer composition containing a base rubber and microballoons,
the cylindrical inner layer has a foaming ratio ranging from 1.2 to 5.0,
the cylindrical outer layer is a foamed layer formed from a rubber composition containing acrylonitrile-butadiene based rubber and a foaming agent, and
the cylindrical outer layer has a smaller foaming ratio than the cylindrical inner layer.

10. The golf club according to claim 9, wherein the inner layer composition contains the microballoons in an amount ranging from 5 parts by mass to 20 parts by mass with respect to 100 parts by mass of the base rubber.

11. The golf club according to claim 9, wherein the base rubber is at least one selected from the group consisting of a natural rubber, an ethylene-propylene-diene rubber, a butyl rubber, an acrylonitrile-butadiene rubber, a hydrogenated acrylonitrile-butadiene rubber, a carboxyl-modified acrylonitrile-butadiene rubber, a butadiene rubber, a styrene-butadiene rubber, and a polyurethane rubber.

12. The golf club according to claim 9, wherein the acrylonitrile-butadiene based rubber is at least one selected from the group consisting of a carboxyl-modified acrylonitrile-butadiene rubber, a hydrogenated acrylonitrile-butadiene rubber, and a carboxyl-modified hydrogenated acrylonitrile-butadiene rubber.

13. The golf club according to claim 9, wherein the grip for sporting goods comprises an adhesive layer between the cylindrical inner layer and the cylindrical outer layer.

14. The golf club according to claim 9, wherein the cylindrical outer layer has a thickness of 0.1 mm or more.

15. The golf club according to claim 9, wherein the cylindrical outer layer has a material hardness ranging from 30 to 80 in JIS-A hardness, and the cylindrical inner layer has a material hardness ranging from 10 to 80 in JIS-A hardness.

16. The golf club according to claim 9, wherein the cylindrical outer layer is a solid layer.

* * * * *